(12) United States Patent
Orcutt

(10) Patent No.: US 6,644,820 B2
(45) Date of Patent: Nov. 11, 2003

(54) TEMPERATURE STABILIZED MIRROR FOR SWITCHING OPTICAL SIGNALS

(75) Inventor: John W. Orcutt, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/060,855

(22) Filed: Jan. 30, 2002

(65) Prior Publication Data

US 2003/0142421 A1 Jul. 31, 2003

(51) Int. Cl.[7] .................................................. G02B 5/08
(52) U.S. Cl. ........................ 359/838; 359/841; 359/872; 359/871; 359/222; 359/224
(58) Field of Search .................................. 359/838, 841, 359/872, 871, 221, 222, 223, 224, 225, 226; 219/219, 203, 482, 505

(56) References Cited

U.S. PATENT DOCUMENTS

| 4,276,536 A | * | 6/1981 | Wisnia | 338/23 |
|---|---|---|---|---|
| 4,410,790 A | * | 10/1983 | Berg et al. | |
| 4,849,611 A | * | 7/1989 | Whitney et al. | 219/538 |
| 5,298,721 A | * | 3/1994 | Smuckler | 219/505 |
| 5,514,940 A | * | 5/1996 | Okamoto | 318/469 |
| 6,441,356 B1 | * | 8/2002 | Mandella et al. | 250/201.3 |
| 6,460,335 B1 | * | 10/2002 | Buschatz | 60/527 |

* cited by examiner

Primary Examiner—Mohammad Sikder
(74) Attorney, Agent, or Firm—William B. Kempler; W. James Brady, III; Frederick J. Telecky, Jr.

(57) ABSTRACT

A temperature stabilized optical mirror is disclosed. A rotatable mirror for switching optical light signals between optical fibers is mounted on a support structure. One or more PTC (Positional Temperature Coefficient) resistors are mounted to the support structure to provide heat to the combination support structure and mirror so as to maintain the mirror and support structure above a lower limit of a selected temperature range. The PTC resistor is selected to have a switching temperature substantially equal to the lower limit of the select temperature range.

9 Claims, 4 Drawing Sheets

TEMPERATURE STABILIZED MIRROR FOR SWITCHING OPTICAL SIGNALS

FIELD OF THE INVENTION

The invention relates generally to optical switching systems and more particularly to methods and apparatus for providing temperature stability to mirrors for reducing alignment variations during operation of the mirror due to environmental temperature changes.

BACKGROUND OF THE INVENTION

In recent years optical fibers have come into wide spread use in a wide variety of applications in which optical signals are transmitted along such fibers and are switched from one fiber to another by means of an optical switch. Conventional optical switches generally include structure to support fiber positioning, alignment signal emitters and interconnected computer control electronics. A fiber positioning structure is provided near the end of each fiber to selectively point the end of a fiber in one fiber group toward the end of a selected fiber in another fiber group to provide switched optical transmission between the two fibers. An alignment signal emitter is provided near an end of and in predetermined spaced relationship to the end of each fiber to emit an alignment signal for controlling the fiber positioning structure when aligning the ends of selected fibers in the fiber groups for switched optical transmission there between. Examples are shown in U.S. Pat. Nos. 4,512,036 and 5,177, 348. This approach requires considerable complexity and duplication of alignment structure and circuits for each alignable fiber. It would be advantageous to reduce this complexity and duplication and to increase speed of switching, reliability, as well as to reduce cost in implementation. As will also be appreciate by those skilled in the art, once alignment of the two fibers is complete, a large subsequent change in the operation temperature from that existing at the time of alignment may cause sufficient misalignment to interrupt light signal transfer between the two fibers. It would also be advantageous to reduce the effect of environmental temperature changes on the alignment and transmission of the fibers.

Texas Instruments presently manufactures a two-axis analog mirror MEMS device fabricated out of a single piece of material (such as silicon, for example) typically having a thickness of about 115 m. The layout consists of an oval mirror (normally about 3.8 mm×3.2 mm) supported on a gimbal frame by two silicon torsional hinges. The gimbal frame is attached to a support frame by another set of torsional hinges.

The present invention is particularly suitable for reducing the effects of environmental temperature change on the two-axes analog mirror optical switch manufactured by Texas Instruments of Dallas, Tex. that overcomes the limitations of the prior art, and which is relatively low in cost and is reliable in operation.

For example, presently available optical transmission switches available from Texas Instruments employ a microelectromechanical (hereinafter MEM) movable mirror assembly with associated drive means such as for example only electromagnet coils, and may also include an LED and position control photo diodes with both drive and position control signals supplied through a standard connector or wiring harness. The drive signals to the electromagnetic coils, and signals to and from the positional electronics presently require a nine or ten wire connector and/or harness.

The mirror is typically mounted to a support structure of suitable material, such as ceramic, along with the driving means and a wiring harness. The mirror is mounted in a housing in which light from an optical fiber is received such that the mirror is disposed in alignment with the fiber for reflecting an incoming optical signal from the optical fiber to another optical fiber.

SUMMARY OF THE INVENTION

Objects and advantages of the invention will in part be obvious, and will in part appear hereinafter, and will be accomplished by the present invention which provides heat to the ceramic support structure and mirror to maintain the device within a selected temperature range. The apparatus and method of the invention is well suited for controlling the amount of heat to the combination mirror and support structure to accurately maintain the selected temperature range. The method and apparatus of the invention comprises a base support member which may be made of a ceramic or any other suitable material. A mirror rotatable about at least one set of axis is mounted on the support member. The mirror will operate over a wide range of temperatures, such as for example between 0° C. and 70° C. However, to assure proper alignment during operation, the present invention maintains the temperature range of the apparatus during operation over a much smaller range which includes the upper temperature limit of the allowable operating range. At least one PTC resistor having a switching temperature selected to be within about 20° C. of the upper temperature limit is mounted on the support member so as to heat the mirror and support member up to the switching temperature of the PTC resistor. This maintains the temperature of the mirror between a temperature range of the switching temperature of the PTC resistor and the upper temperature limit of the allowable operating range of the mirror. The mirror is operated over this reduced temperature range and thus any misalignment due to temperature variation is substantially reduced.

There is also included at least one drive module such as for example only an electromagnetic coil or alternately an electrostatic plate located on the topside of the base support board and which has input connections. The drive module is used for providing rotational forces to the optical mirror mounted on the topside of the support board and above the drive module. If the drive module is a single coil, the coil may be used to cause rotation of the mirror about an axis in a first direction by providing current flow in one direction. Similarly, rotation may be provided in the other direction by reversing the current flow. The rotation around the axis, however, may also be more readily accomplished by using two drive coils instead of a single coil. Likewise, as is discussed in detail hereinafter, rotation of the mirror about two axes may be accomplished by using two coils (one coil per axis) or four coils (a pair of coils per axis) or alternately, by using electrostatic plates.

The mirror used in the assembly, (both one axis of rotation or two axis of rotation) is preferably made from a single piece of crystalline material such as silicon and has three portions connected by two sets of hinges. An inner portion forms the mirror and is hinged on each of two opposite sides of the mirror portion, to a middle gimbals portion, which surrounds the mirror portion. This allows the mirror portion to rotate about the gimbals portion, providing the first axis of rotation. A second set of hinges attaches the gimbals portion to a frame portion by a pair of hinges having one hinge on each of two opposite sides on a line disposed, preferably orthogonal or 90° relative to a line drawn through the first set of hinges. This allows the gimbals portion, which carries the mirror, to rotate about the frame portion, providing a second axis of rotation.

In one embodiment, two pair of magnets, one pair for each axis of rotation, are used to increase the magnetic response of the mirror portion and are mounted to the mirror portion and the gimbals portion. The first pair of magnets are attached by suitable means to the mirror portion of the mirror assembly, one on each of two opposite sides of a line, 90° relative to a line through the mirror/gimbals portions set of hinges. When subjected to a magnetic field, the mirror portion rotates about the mirror/gimbals portions set of hinges, providing the first axis of motion. The second pair of magnets are suitably attached to the gimbals portion of the mirror assembly, one on each of two opposite sides of a line, 90° relative to a line drawn through the gimbals/frame portions set of hinges. In the same manner as discussed above, when subjected to a magnetic field, the mirror and gimbals portions rotate about the second set of axis, to providing the second axis of rotation.

To obtain extended operation without degradation, the mirror assembly may be hermetically assembled into a cavity in the package to lock out moisture and allow the provision of a benign atmosphere for mirror operation. The cavity can be filled with selected gases to provide improved heat transfer and, if desired, exclude oxygen water vapor and other materials that would adversely affect the mirror over time.

According to one embodiment using drive coils as the drive modules, the drive coils preferably employ a push and pull arrangement for driving the mirror magnets to rotate the mirror portion to the desired orientation in its two axes. The coil leads are connected to control electronics to allow system electrical control of the coils and their push pull arrangement to drive the mirror assembly. The drive coils are wound on bobbins preferably made of aluminum or other eddy current generating material, and sufficient amounts of aluminum should be provided at the top and bottom of the bobbins to allow eddy current dampening of the movable portions of the mirror assembly, to prevent unwanted oscillations.

BRIEF DESCRIPTION OF THE DRAWINGS

For a more complete understanding of the present invention and further advantages thereof, reference is now made to the following detailed description of the preferred embodiments taken in conjunction with the drawings in which.

DETAILED DESCRIPTION OF EMBODIMENTS OF THE INVENTION

Figure 1:
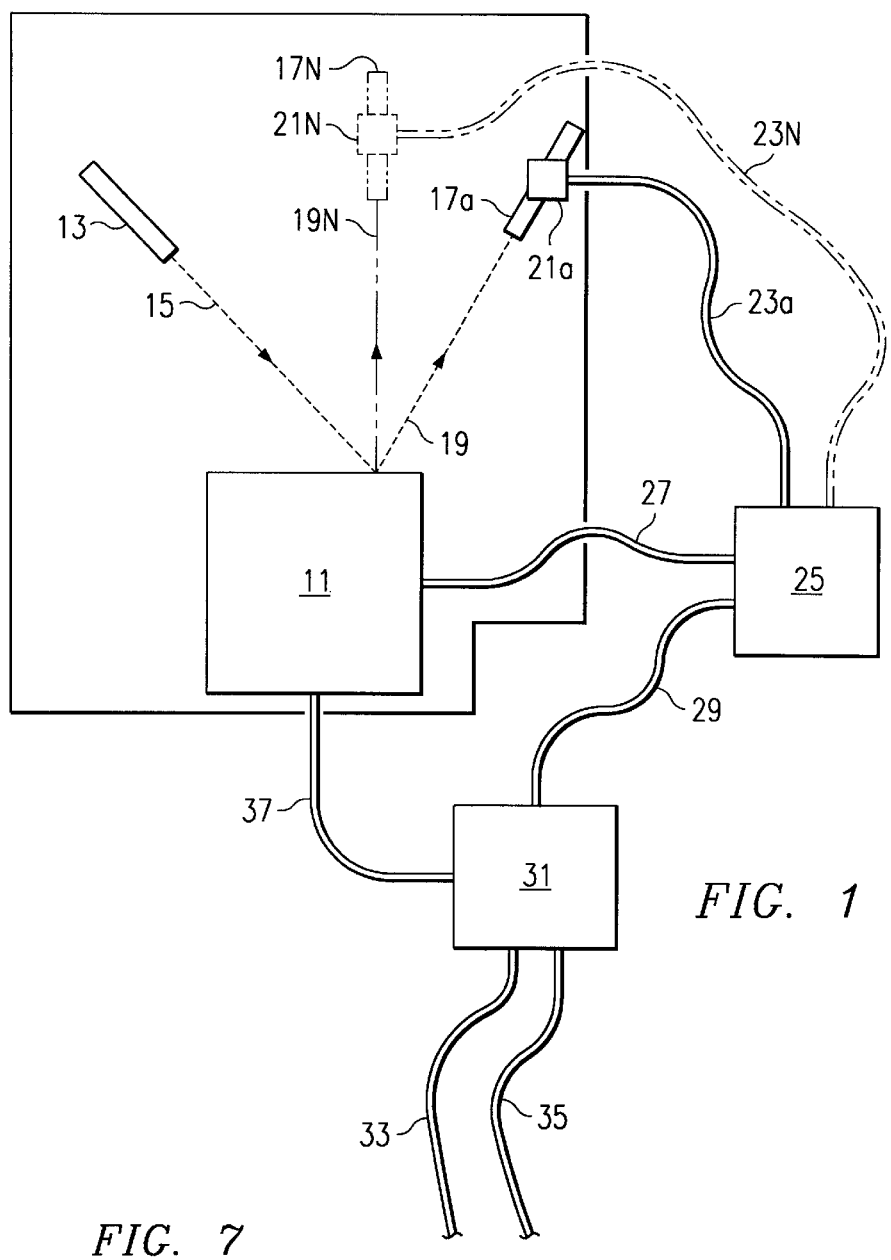
FIG. 1 is diagrammatic representation of an optical switching system using a mirror that is selectively rotatable about at least one axis.

Referring now to FIG. 1, there is shown a system level diagram that provides a rotating mirror for switching a beam of light carrying signals between optical fibers. As shown in FIG. 1, there is included optical switching apparatus 11 comprising an optical mirror, the associated drivers and the position monitoring electronics. In the illustrated embodiment, there is a source fiber optic 13 which provides an optical signal carrying data, such as for example, a laser beam 15. Also as shown, there is a second optical fiber 17a which is indicated as receiving an optical signal 19 from the switching (not shown) mirror in apparatus 11. There is also indicated another receiving fiber 17n indicated by dotted lines. It will be appreciated by those skilled in the art, that although there are only two receiving optical fibers 17a–17n illustrated in the diagram, there may be a large number of these fibers as indicated by the letter "n" for the fiber optic 17n. Although there may be a large number of such optical fibers, it is only necessary to illustrate one emitting fiber (13) and one receiving fiber (17a) to describe the features of the present invention. However, the reader should understand that everything discussed with respect to receiving fiber optic 17a is true for the other multiplicity of fiber optics that may be included. Also as shown, fiber optic 17a includes a beam monitor device 21a for sensing the optical signal strength. The beam monitoring device 21a converts the optical signal to an electrical signal representative of the strength of the beam through electrical or feedback cables 23a. Feedback cable 23a goes to a system control box 25. As will become clear, system control box 25 also receives signals on cable 27 indicative of the position of the mirror in the apparatus 11. For a two-axis analog mirror, there may typically be feedback signals provided from four different sensors in apparatus 11 for the mirror. System control box 25 provides the necessary control information signals on cable 29 to the drive electronics 31. Also as shown, drive electronics 31 receives a ground and power line 33 and 35 as indicated. Drive electronics 31 provides the drive signals to the apparatus (such as drive coils or electrostatic plates) used to position the mirror. These drive signals along with the power and ground lines are provided by cable 37. If the mirror is a two axis mirror providing the drive signals, will require three or four lines for each of the mirrors of the array. In addition, if the mirror positioning signals are four photodiodes, there typically will be also a power signal to an LED associated with each of the mirrors. Thus, it will be appreciated that there will typically be about nine different signal leads provided to and from the two-axis mirror.

Therefore, the following discussion illustrates the operation of various embodiments of mirrors suitable for use with the invention. Mirror assembly 41 of FIG. 2 includes a frame portion, an intermediate gimbals portion and an inner mirror portion preferably formed from one piece of crystalline material such as silicon. The silicon is etched to provide outer frame portion 43 forming an opening in which intermediate annular gimbals portion 45 is attached at opposing hinge locations 55A and 55B along first axis 31. An inner, centrally disposed mirror portion 29, having a mirror centrally located thereon, is attached to gimbals portion 45 at hinge portions 47A and 47B on a second axis 35 that is orthogonal or rotated, 90° from the first axis. The mirror on mirror portion 29, which is on the order of 100 microns in thickness, is suitably polished on its upper surface to provide a specular or mirror surface. In order to provide necessary flatness, the mirror is formed with a radius of curvature greater than approximately 2 meters, with increasing optical path lengths requiring increasing radius of curvature. The radius of curvature can be controlled by known stress control techniques such as, by polishing on both opposite faces and deposition techniques for stress controlled thin films. If desired, a coating of suitable material can be placed on the mirror portion to enhance its reflectivity for specific radiation wavelengths.

According to the illustrated embodiment, mirror assembly 41 also comprises a first pair of permanent magnets 53A and 53B mounted on gimbals portion 45 along the second axis and a second pair of permanent magnets 57A and 57B mounted on extensions 51, which extend outwardly from mirror portion 47 along the first axis. In order to symmetrically distribute mass about the two axes of rotation to thereby minimize oscillation under shock and vibration, each permanent magnet 53A, 53B, 57A and 57B preferably comprises a set of an upper magnet mounted on the top surface of the mirror assembly 41 using conventional attachment techniques such as indium bonding, and an aligned lower magnet 53b similarly attached to the lower surface of the mirror assembly as shown in FIGS. 2a–2d. The magnets of each set are arranged serially such as the north/south pole arrangement indicated in FIG. 2c. There are several possible arrangements of the four sets of magnets which may be used, such as all like poles up, or two sets of like poles up, two sets of like poles down; or three sets of like poles up, one set of like pole down, depending upon magnetic characteristics desired.

By mounting gimbals portion 45 to frame portion 43 by means of hinges 55A and 55B, motion of the gimbals portion 45 about the first axis 31 is provided. Similarly, by mounting mirror portion 29 to gimbals portion 45 via hinges 47A and 47B, motion of the mirror portion relative to the gimbals portion is obtained about the second axis 35, thereby allowing independent, selected movement of the mirror portion 29 along two different axes.

Figure 2:
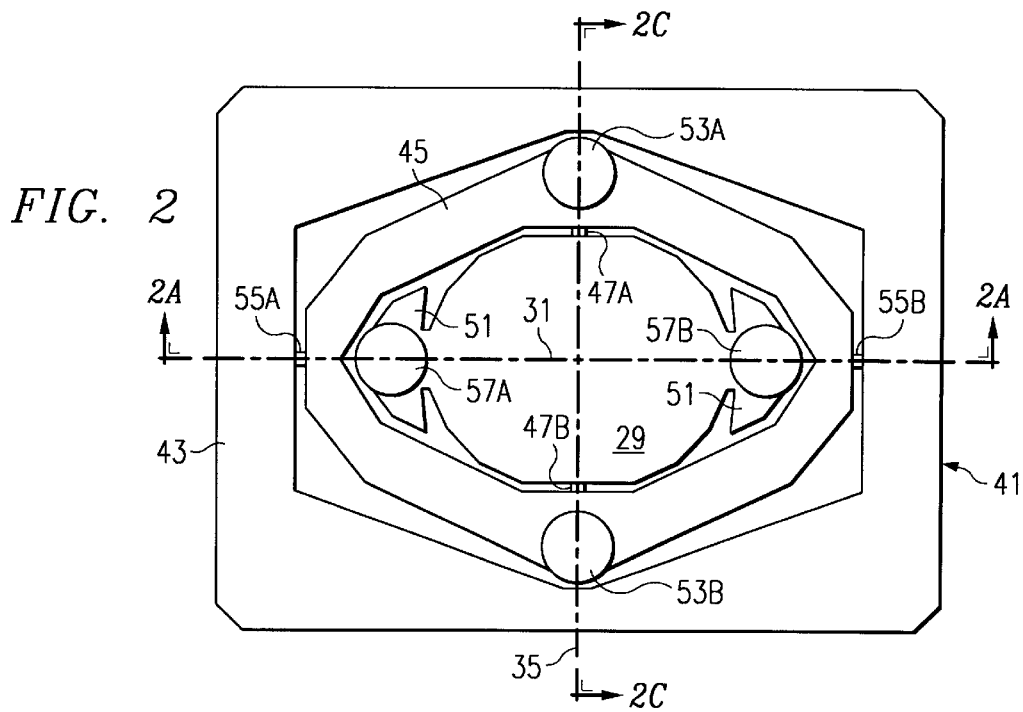
FIG. 2 is a plan view of a mirror assembly used in the switching unit of FIG. 1.
Figure 2A:
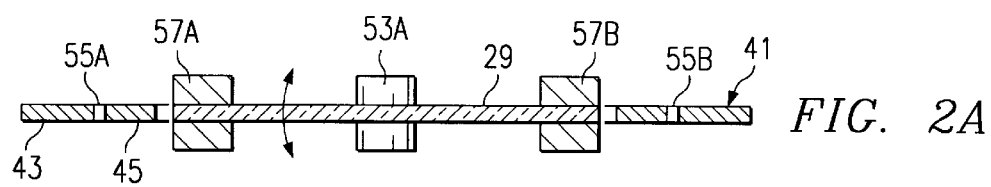
FIG. 2a is a cross sectional view taken on line 2A—2A of FIG. 2.
Figure 2B:
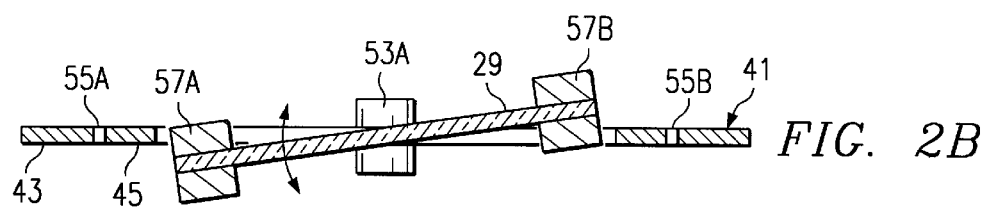
FIG. 2b is a view similar to FIG. 2a but showing rotation of the mirror portion of the mirror assembly.
Figure 2C:
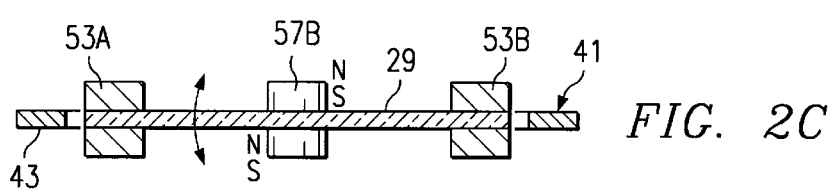
FIG. 2c is a cross sectional view taken on line 2B—2B of FIG. 2.
Figure 2D:
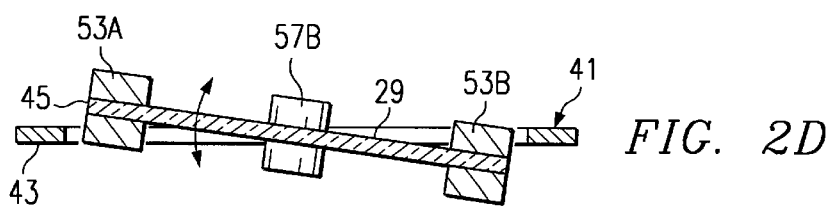
FIG. 2d is a view similar to FIG. 2c but showing rotations of the gimbals portion of the mirror assembly.

The middle or neutral position of mirror assembly 41 is shown in FIG. 2a, which is a section taken through the assembly along line 2A—2A of FIG. 2. Rotation of mirror portion 29 about axis 35 independent of gimbals portion 45 and/or frame portion 43 is shown in FIG. 2b as indicated by the arrow. FIG. 2c shows the middle position of the mirror assembly 41, similar to that shown in FIG. 2a, but taken along line 2C—2C of FIG. 2. Rotation of the gimbals portion 45 and mirror portion 47 about axis 31 independent of frame portion 43 is shown in FIG. 2d as indicated by the arrow. The above independent rotation of mirror portion 29 about the two axes allows direction of optical beam 13 as needed by the optical switch units.

In order to protect the torsional hinges 47A, 47B, 55A and 55B from in-plane shock during handling and shipping, stops (not shown) may be provided as an optional feature of the invention. AT this point, it should be noted that the mirror assembly is on the order of 100 microns thick, whereas the hinges of the same thickness are on the order of 10 microns wide, thereby providing robust strength in directions normal to the surface of the assembly. In order to provide protection against excess in-plane motion 90° to the axis of the hinge, for example, axis 31, cooperating surfaces may be formed on gimbals portion 45 and frame portion 43.

The magnetic drive for the magnets comprise four coils, each wound on a bobbin. The bobbin is typically made of suitable material such as aluminum for good heat transfer, magnetic dampening, and strength. The coils are wound using high electrical conductivity materials such as copper. The bobbin has a coil disposed proximate the top end such that the coil is as close to the permanent magnets as possible.

Figure 3:
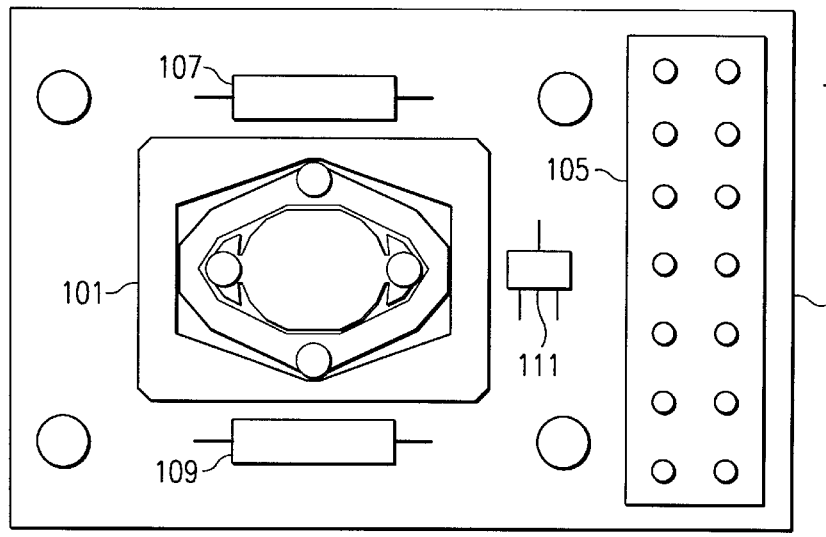
FIG. 3 is a top view of a mirror assembly showing the present method of temperature control.

Referring now to FIG. 3, there is show the present method of controlling the temperature of a mirror to reduce misalignment. As shown, a mirror structure 101 is mounted on a support structure 103. Also shown in dotted lines is an input/output connector 105 for providing and receiving signals that control and monitor the operation of the mirror structure. To regulate the temperature of the structure there is further included one or more resistors, such as resistors 107 and 109 used to provide heat to the support structure 101. Temperature sensor 111 monitors the temperature of combination structure and switches power into the resistors 107 and 109 when the sensed temperature falls below a selected level. Temperature sensor 111 may also monitor the upper temperature reached by the combination structure and switch power off at the two resistors 106 and 108 when and if an upper temperature limit is reached. Thus as is discussed in more detail below, by controlling the operating temperature of the combined structure, the amount of mechanical drift and consequently the amount of misalignment is controlled.

Figure 4A:
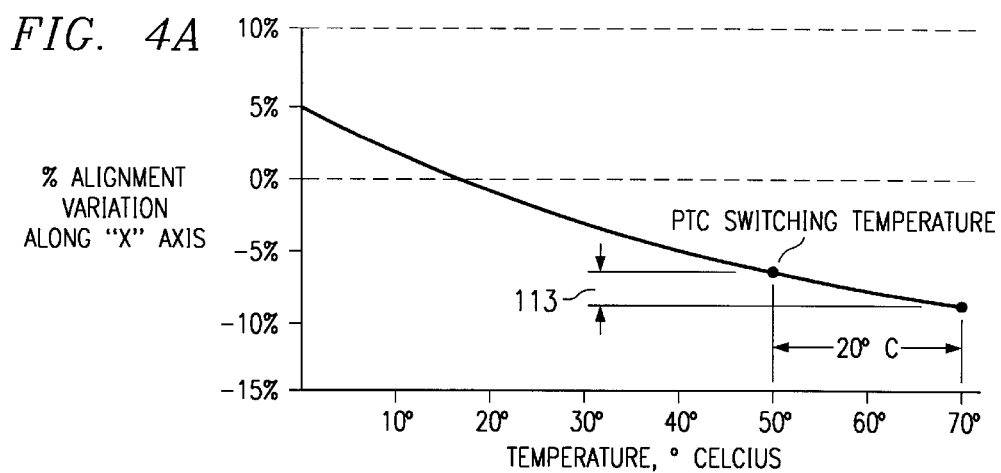
FIGS. 4a and 4b are graphs representing percent of distortion versus temperature in degrees Celsius.

FIG. 4A, is a graph of the percentage of alignment variations along an "x" axis due to Temperature versus Temperature in degrees Celsius across an operating temperature range of the mirror structure. As shown, the mirror drifts from a value of about plus 4% at 0° C. to about minus 9% at 70° C., or about 13% total. The mirror is designed to operate satisfactorily across this temperature range. However, for most system operations, this amount of alignment variation due to temperature would be completely unacceptable, and could possibly result in so much misalignment that a reflected light beam would not hit its target fiber. Therefore some technique for limiting the distortion due to temperature must be used.

Figure 4B:
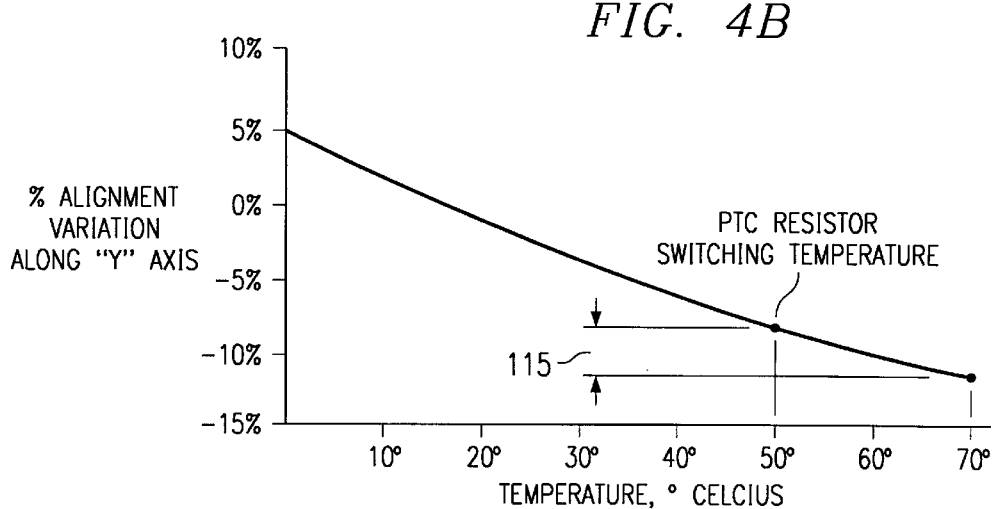

According to the present invention, a temperature range that includes the upper temperature limit of the acceptable operating temperature range is selected. The lower limit is then selected about 20° C. below the upper limit, or about 50° C. as show in FIG. 4A. Thus, a PTC (Positive Temperature Coefficient) resistor having a switching temperature of about 50° C. can be substituted for the much more complex sensor and resistor combination circuitry used heretofore. As shown in graph 4A and indicated by double headed arrow 113, the percent change in the alignment variation resulting from temperature variations is limited to a little less than 5%, which represents an acceptable amount. Of course controlling the temperature affecting alignment variations along the "x" axis will also control the alignment variations along a "y" axis as illustrated by the double-headed arrow 115 in FIG. 4b. For example, as shown the percentage change is between about minus 8% to minus 12.5%, or a total of about 4.5% over the acceptable operating temperature range.

Figure 5:
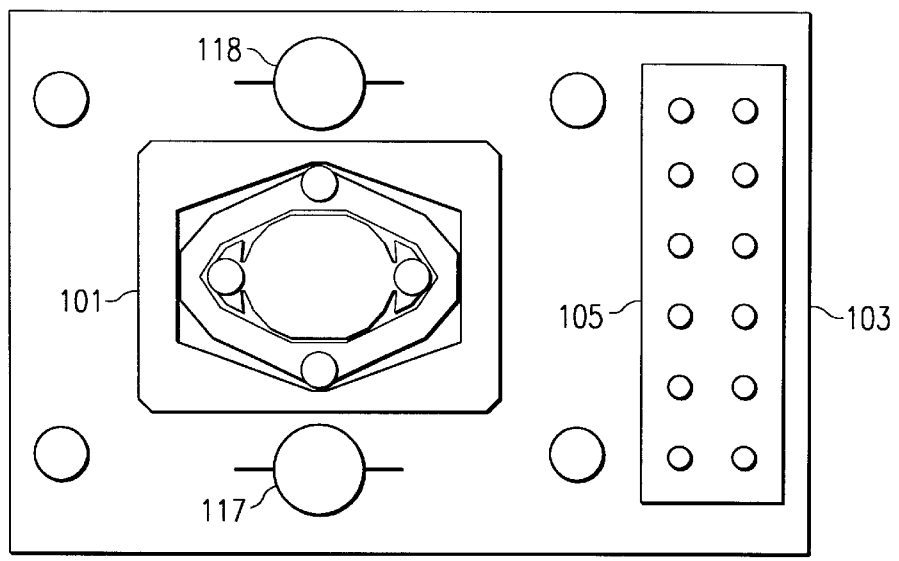
FIG. 5 is a top view of a mirror incorporating the method of temperature control of the present invention.

FIG. 5 illustrates the apparatus of the present invention. Those portions of the figures that are the same as the structure of FIG. 3 carry the same reference numbers. As shown, sensor 111 has been eliminated and standard resistors 107 and 109 have been replaced with PTC resistors 117 and 118. PTC (Positive Temperature Coefficient) resistors are self-contained devices having a low resistance and consequently a high current flow below a "switching" temperature. Thus the dissipated power or ($I^2R$ heat) is substantial. This heat is used to raise the overall temperature of the combined mirror structure. However, once the switching temperature of the PTC resistor is exceeded, the resistance across the resistor increases significantly (perhaps as much as 10 times) such that the current flow is significantly reduced. This reduced current flow substantially eliminates any heating of the mirror structure by the PTC resistors. In addition, the PTC resistor will, of course, switch back to its low resistance state if the temperature drops a few degrees (about 5° C.). Therefore, by selecting the PTC resistors to have a switching temperature at a level approaching (i.e. within about 20° C.) the upper end of the acceptable operating temperature of the mirror, and further selecting the resistors sufficiently large to provide enough heat when operating below the switching temperature to readily raise the combination mirror structure to the switching temperature of the PTC resistor, the temperature of the mirror structure can be effectively and simply controlled within the upper 20° C. operating range of the mirror apparatus. This, of course in turn maintains the alignment, within acceptable limits. For example, it is believed that a PTC resistor having a switching level of about 50° C. would operate effectively.

Figure 6:
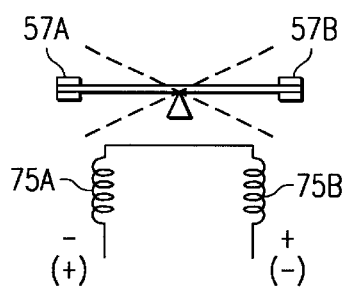
FIG. 6 is a schematic diagram illustrating one embodiment of the electrical connection for a pair of coils associated with one axis of rotation.

Although the arrangement and operation of the movable mirror has been described with regards to specific embodiments thereof, variations and modifications will become apparent to those skilled in the art. For example, magnet and coil locations other than those described above can be employed as long as appropriate currents can be applied to the air coils to move the gimbaled mirror to a desired orientation. The two coils associated with rotation or movement along an axis can of course operate independently. However, with reference to the two pairs (or four coil) arrangement shown, a push-pull drive coil arrangement for each axis as shown in FIG. 6 is particularly suitable. As indicated in FIG. 6, the two coils 75a and 75b for providing movement about axis 35 may be connected in series such that one coil attracts the associated permanent magnet and the other coil repels its associated magnet in response to a DC signal. Then, by simply reversing the direction of the current, the mirror can be moved in the opposite direction. A similar arrangement would be applied for coils working with magnets 53a and 53b for providing rotation about axis 31. It should also be appreciated that a single coil with or without an associated permanent magnet can also provide movement about an axis. Further, it may also be desirable to provide rotation from a neutral position in only one direction.

Figure 7:
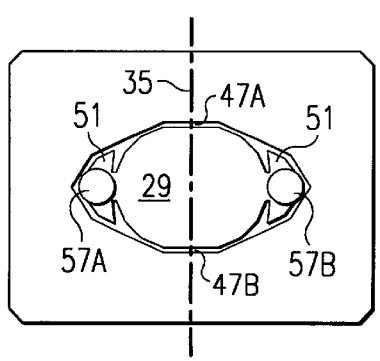
FIG. 7 is a top view of a mirror having a single axis of rotation.

In addition, it may be sufficient that the mirror rotate only about a single axis. Such an arrangement could of course use the two-axis mirror arrangement shown in FIG. 2, by not providing (or not activation) drive coils for one of the axis. However, if a single axis operation is desired, a more rugged mirror arrangement would be to provide mirrors with only a signal axis of rotation such as illustrated in FIG. 7.

Further, although permanent magnets are shown attached to the movable mirror assembly, it will be appreciated that, if desired, magnetic material polarized perpendicular to the mirror surface could be added to the assembly instead of the permanent magnets.

Figure 8:
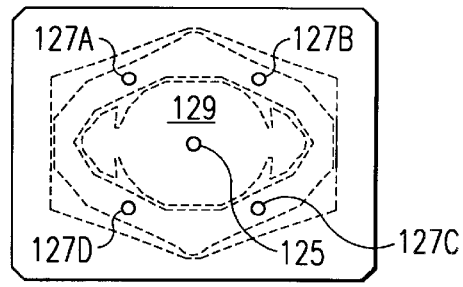
FIG. 8 is a top view of the position monitoring electrons comprising a single LED and four photo detectors.

Referring now to FIG. 8, there is shown position monitoring electronics comprised of a single LED 125 and four photo detectors 127a, 127b, 127c and 127d around the parameter of the mirror, which is shown in dotted lines. The position of the mirror 129 is determined by the amount of light from LED 125 received by the four various photo detectors.

Figure 9A:
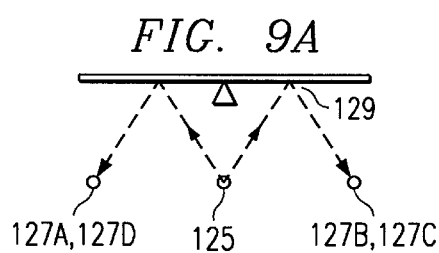
FIGS. 9a and 9b are schematic views illustrating the operation of the LED and four photo detectors of FIG. 8 as the position monitoring electronics.
Figure 9B:
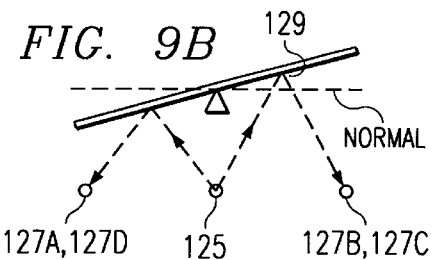

Referring now to FIGS. 9a and 9b there is shown a schematic illustrating this technique. As shown in FIG. 9a, mirror 129 has not been rotated and light from light emitting diode 125 is received substantially equal at all four of the photo detectors 127a–127d. Thus, as shown, for photo detecting diodes 127a and 127d the light path distance from LED 125 is substantially the same as it is to photo detectors 127c and 127d. Consequently, the amount of light received at all four detectors is substantially the same. However, as shown in FIG. 9b, mirror 129 has been rotated around its axis such that the mirror 41 tilts toward photo detectors 127a and 127d while tilting away from photo detectors 127b and 127c. Thus, the light path from LED 125 to 127 photo detectors 127a and 127b is now shorter than the light path between LED 125 and photo detectors 127b and 127c. Thus, light detectors 127b and 127c will not receive as much light, whereas photo detectors 127a and 127d will receive greater amounts of light.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A temperature stabilized optical mirror comprising:
   a support board;
   an optical mirror having a maximum allowable operating temperature and mounted to said support board;
   at least one positive temperature coefficient (PTC) resistor mounted to said support board for heating said mirror, said PTC resistor having a switching temperature at a selected temperature representing a lower limit of a selected operating range; and
   a power source connected across said at least one PTC resistor to cause said PTC resistor to heat and maintain said support board and said optical mirror within a temperature range extending between said maximum allowable operating temperature and a lower limit temperature substantially the same as said switching temperature of said PTC resistor wherein said mirror mounted to said support board comprises mounting a mirror rotatable about two axes.

2. The optical switching device of claim 1 wherein said at least one PTC resistor comprises two PTC resistors.

3. The optical switching apparatus of claim 1 wherein said PTC resistor has a switching temperature of about 50° C.

4. The optical mirror of claim 1 wherein said mirror mounted to said support board comprises mounting a mirror rotatable about a single axis.

5. The optical mirror of claim 1 wherein said switching temperature of said PTC resistor is about 20° C. less than said maximum allowable operating temperature.

6. The optical mirror of claim 1 wherein said lower limit temperature of said temperature range is about 50° C.

7. The optical mirror of claim 6 wherein said maximum allowable operating temperature of said mirror is about 70° C.

8. The optical mirror of claim 1 wherein said mirror is fabricated from a single piece of material.

9. The optical mirror of claim 1 wherein said mirror is fabricated from a single piece of silicon.

* * * * *